United States Patent [19]

Browning

[11] Patent Number: 4,821,959
[45] Date of Patent: Apr. 18, 1989

[54] PUMP AND SPRAYER ATTACHMENTS FOR LAWN MOWERS

[76] Inventor: Henry A. Browning, Rt. 1, P.O. Box 90, Quitman, Ga. 31643

[21] Appl. No.: 79,424

[22] Filed: Jul. 30, 1987

[51] Int. Cl.⁴ .................. A01D 34/00; F04B 17/00
[52] U.S. Cl. .................................... 239/121; 56/16.8; 56/16.9; 403/307; 403/343
[58] Field of Search ............... 239/120, 121, 124, 127, 239/172, 289, 302, 390, DIG. 6; 56/16.8, 16.9; 403/307, 343

[56] References Cited

U.S. PATENT DOCUMENTS

| | | | |
|---|---|---|---|
| 1,761,723 | 6/1930 | Greer | 239/172 |
| 2,044,884 | 6/1936 | Keller | 56/16.8 |
| 2,679,414 | 5/1954 | Hornschuch | 403/307 |
| 2,722,456 | 11/1955 | Glessner | 239/127 |
| 2,939,636 | 6/1960 | Mullin | 56/16.8 |
| 3,143,295 | 8/1964 | Booker | 239/127 X |
| 3,147,767 | 9/1964 | Goss | 239/127 X |
| 3,151,563 | 10/1964 | Lita et al. | 417/236 |
| 3,201,158 | 8/1965 | Meripol | 403/307 |
| 3,491,949 | 1/1970 | Hairston | 239/127 |
| 3,813,190 | 5/1974 | Keating | 417/236 |
| 3,857,515 | 12/1974 | Zennie | 237/289 X |
| 4,242,855 | 1/1981 | Beaver, Jr. | 56/13.7 |
| 4,308,676 | 1/1982 | Doane | 56/16.9 |
| 4,602,742 | 7/1986 | Penson | 239/172 |
| 4,653,254 | 3/1987 | Qualls | 56/16.9 |
| 4,778,349 | 10/1988 | Browning | 417/231 |

FOREIGN PATENT DOCUMENTS 235956 10/1967 U.S.S.R. .................. 239/289

OTHER PUBLICATIONS

Brochure: W W Grinder Inc.
Brochure: "Dobbins" Master Manufacturing Co.
Brochure: Centry Lawn & Garden Spray.
Brochure: Sprayman, Inc.
Brochure (Catalog): 87/88 Broyhill Co.
Brochure: "The Spray Team" Demco.
Brochure: Kuker Line: 1987.

Primary Examiner—Andres Kashnikow
Attorney, Agent, or Firm—Dowell & Dowell

[57] ABSTRACT

A pump and sprayer attachment for lawn mowers wherein a pump is connected to the uppermost end of the engine drive or crank shaft so as to be in direct drive relationship with respect thereto. A source of liquid supply may also be mounted to the lawn mowers with suitable fluid conveying conduits communicating the liquid source through the pump to fluid sprayers which are suitably connected with the fluid conveying conduits.

22 Claims, 2 Drawing Sheets

PUMP AND SPRAYER ATTACHMENTS FOR LAWN MOWERS

BACKGROUND OF THE INVENTION

1. Field of the Invention

This invention is generally directed to implements or attachments for use with power lawn mowers and more specifically to pump attachments which may be directly connected to the uppermost end of the engine drive shaft so as to be supported and drivingly engaged by the engine drive or crank shaft. In the preferred embodiment of the invention, a fluid reservoir is selectively secured to the lawn mower and connected through fluid conduits and the pump to one or more sprayers which may be selectively utilized as desired. With the present invention, a conventional lawn mower may be utilized to provide power to the pump for pumping various fluids in differing environments and may also be converted into a self-powered mobile spraying unit which can be utilized to effectively discharge fertilizers, insecticides and other liquids as may be required by individual homeowners.

2. History of the Related Art

In the past, most implements or attachments for use with powered lawn mowers have been the type of equipment which is normally pushed, pulled or otherwise supported by the lawn mower without any necessity being made for powering the implement directly from the lawn mower engine. Other types of implements such as rotor tillers and the like which are utilized with larger garden type tractors, receive power from special power take-offs which are designed similarly to the power take-offs utilized on larger farm tractors. Such power take-offs are specifically designed to provide a rotary driving motion for powering various implements.

In applicant's copending U.S. Patent Ser. No. 06/798,541, filed Nov. 15, 1985, entitled Multiple Machine Drive Shaft and Coupler Adapter Assembly, now U.S. Pat. No. 4,778,349, one such arrangement for a power take-off for driving one or more pumps is disclosed. In that invention, the rotary power from a power take-off on a tractor is conveyed to one or more pumps which may be interconnected and driven along a common drive axis. The pumps may be utilized to permit the simultaneous application of a plurality of fertilizers, weed killers and/or insecticides as the tractor passes through a field.

With smaller more conventional lawn mowers including push lawn mowers or lawn mowers having horsepower ratings generally in the range of 3.0 to 18 horsepower and which do not have a separate power take-off, little use has been made of the engine to provide power to supplemental implements and especially to implements for pumping or spraying fluids.

Today, many homeowners must rely upon commercial lawn services to provide necessary applications of fertilizers, weed killers, insecticides and the like in order to maintain lawns and gardens in proper condition. Fertilization and weed control applications provided by commercial services are often very expensive with the results not always being satisfactory as might otherwise be possible when an individual takes a personal interest in the application of the fertilizer, weed killer or insecticide to their own yard or garden. Unfortunately, most implements provided for fertilization for homeowners are either drop or broadcast spreaders or liquid sprayers that are hand pumped to provide sufficient pressure to spray small areas. In addition, some insecticide dispensers have been manufactured for direct incorporation with a household water source wherein the insecticide is directly attached to a hose for concurrent dispensing of the fluid being discharged from the hose. Again, such applications are limited in their scope and are not suitable for use over large areas. Also, such prior art spraying devices to not develop sufficient pressure to allow application of insecticides, fertilizers and weed killers to remote areas including the upper reaches of some shrubbery or trees.

There have been several attempts in the prior art to utilize conventional lawn mowers to power pumps or sprayer systems. In U.S. Pat. No. 3,813,190 to Keating, an emergency pump system is disclosed which is powered by a conventional push lawn mower. In this patent, a coupling adapter is fastened to the lawn mower blade. The coupling adapter extends along a substantial portion of the length of the blade and a depending socket member is secured to a shaft extending into a pump. The pump is mounted within a raised pedestal so that the lawn mower wheels are elevated above the ground during the use of the lawn mower to power the pump. With this type of construction, it is necessary to disengage the pump from the lawn mower every time the lawn mower is to be utilized in a conventional manner. Further, the mounting of the drive connection to the lawn mower blade requires that the blade be activated any time the lawn mower engine is to be utilized to power the pump. Such a situation is not advantageous and presents situations which may be extremely hazardous to an operator. This is especially true as the lawn mower is mounted in elevated relationship with respect to the ground during its use in powering the pump.

A further drawback with respect to the pump system disclosed in the patent to Keating is that the lawn mower cannot be utilized as a mobile drive source for conveying the pumping apparatus from one area to another. Therefore, with this type of arrangement, the pumping apparatus is only suitable for use as a fixed location pump and is not suitable for providing surface applications of liquid fertilizers, water, chemical weed killers and the like.

In U.S. Pat. No. 3,151,563 to Lita et al., another spraying attachment for conventional push lawn mowers is disclosed which is very similar in operation to that of the aforementioned prior art reference to Keating. In this patent, a special extension is adapted to be engaged with the lower portion of the drive shaft below the lawn mower cutting blade. The lawn mower is adapted to be mounted to a housing so as to be raised with respect to the ground. A belt drive power take-off is provided to drive a pump so as to deliver fluid from a fluid receiver to a sprayer. Again, the pumping system of Lita et al. is not a portable system which would permit spraying to be accomplished over large areas. Instead, the lawn mower must be fixed with respect to the pump support base or housing during operation of the pump. Further, with this structure, the lawn mower must be provided with a supplemental extension which must be disengaged every time the lawn mower is to be utilized in a standard capacity in mowing operations.

Additional examples of prior art liquid sprayers or spraying attachments for use with lawn mowers are disclosed in U.S. Pat. No. 2,044,884 to Keller and 2,939,636 to Mullen.

Today's commercially available sprayers for use with lawn mowers are designed to be independently operated systems. Such systems are frequently trailered behind a conventional lawn mower and include their own separate power supply source, such as electrical engines or gasoline engines, to provide a drive source for the pumping equipment associated with such systems. Other sprayer systems are directly mounted to conventional lawn mowers but again are utilized with separate sources of power, i.e. separate electrical supply or gasoline engines. In the foregoing systems, the requirement for a separate and individual power source to be utilized with the equipment is not economical and in many cases inefficient, as when separate electrical power sources are used.

Another example wherein the drive shaft of a lawn mower is used as a power-take off for accessories is disclosed in U.S. Pat. No. 4,308,676 wherein a power take-off is provided above the deck of the mower in order to power an implement for use in snow blowing. Other examples of utilizing the drive shaft of conventional lawn mowers for use as power take-offs for powering accessories or auxiliary equipment are disclosed in U.S. Pat. No. 4,653,254 to Qualls wherein a flexible drive shaft is connected to an edge trimmer with the drive shaft being connected to the upper portion of the lawn mower drive shaft. A similar arrangement is also disclosed in U.S. Pat. No. 4,242,855 to Beaver, Jr.

SUMMARY OF THE INVENTION

This invention is directed to a combination power lawn mower and pump wherein the pump is directly connected to the uppermost portion of the lawn mower drive or crank shaft. The pump includes a central drive shaft which is securely engaged by one end of a coupler assembly. The other end of the coupler assembly is adapted to be securely engaged in rotational relationship with the upper end of the lawn mower drive shaft.

In the preferred embodiment of the invention, the lawn mower may be converted into a portable sprayer by attaching a fluid supply tank thereto and connecting the supply tank with a first fluid conduit extending from the supply tank to the inlet of the pump and a second fluid conduit extending from the outlet of the pump to a control valve assembly and sprayer. In order to promote mixing of the fluid contents within the supply tank and to permit continuous operation of the pump during normal operation of the lawn mower when fluid is retained within the tank, a return fluid conduit is connected from the control valve assembly to the holding tank. The lawn mower may be adapted to apply fertilizers, lawn chemicals, insecticides and the like to extensive surface areas by mounting a spray bar along the rear of the lawn mower and connecting the spray bar to the control valve assembly. Further, an optional hand-held spray wand assembly may also be provided which can be attached directly to an outlet on the control valve assembly to thereby make it possible for the lawn mower to provide a sprayer which can be utilized to apply insecticides and fertilizers to remote areas such as deep within floral beds or in elevated areas within shrubbery, trees and the like.

In order to protect the engine from any adverse deposits of fluids from the pump, a fluid collection tray is mounted around the coupler assembly and intermediate the engine head and the pump. Appropriate seals are provided to retain the tray in fluid-tight relationship between the pump and the engine. The tray is stabilized by appropriate brackets to the engine block and in some embodiments, a drain valve may be provided in the collection tray so as to permit easy dispensing of any fluids deposited therein.

It is a primary object of the present invention to provide a mobile pumping apparatus which is powered by the drive shaft of a conventional power lawn mower and in particular to power riding lawn mowers or lawn and garden tractors wherein the pump may be easily attached to the uppermost end of the drive shaft. In some instances, attachment to the drive shaft may require the removal of the conventional nut which is provided to retain the filtration screen or rotation screen in place over the upper end of the drive shaft or the replacement of the nut by a smaller dimensional locking nut prior to the attachment of the pump. In some applications, it may be necessary to also remove a portion of a hand start rope puller and rewind assembly and provide appropriate access for the drive coupler therethrough.

It is another object of the present invention to provide a pump apparatus in combination with a conventional powered lawn mower which enables the drive shaft of the lawn mower to provide rotational drive input for the pump in order that the pump may be utilized to convey fluids from an intake to an output for a plurality of uses or purposes and wherein the lawn mower allows the pump to be transported from one location to another as selectively desired.

It is yet another object of the present invention to adapt conventional powered lawn mowing equipment to be utilized as pumps or sprayers wherein a pump may be easily and quickly adapted to be connected to the uppermost portion of the drive shaft so that the pump may be installed without necessitating the homeowner to tamper with any components near the cutting blades of the lawn mower and wherein the pump is installed to the drive shaft of the lawn mower in such a manner that the mobility of the lawn mower is not effected while the pump is in use.

It is another object of the present invention to make it possible to convert conventional lawn mowing equipment into portable sprayers which can be utilized to apply liquid fertilizers, weed control chemicals and other fluids to large and expansive surface areas without requiring any major modification to the lawn mower engine, chassis or frame. A fluid holding tank may be supported by the lawn mower with the fluid therefrom being discharged by a pump connected directly to the lawn mower drive shaft and with the fluid being delivered to appropriate spray bars or hand sprayers which may be selectively connected to the output of the pump.

It is yet a further object of the present invention to provide a low cost means for homeowners to convert conventional lawn mowing equipment into portable sprayers by enabling conventional pumps to be directly attached and drivingly connected to the uppermost portion of a lawn mower drive shaft with little installation effort being necessary and without altering the safe operation of the lawn mower.

It is another object of the present invention to provide a pump and sprayer system which can be easily mounted to existing conventional power lawn mowers in order to provide homeowners with an economical lawn and garden sprayer and pumping unit which can be attached to a conventional lawn mower without adversely effecting the performance of the lawn mower or lawn mower engine thereby enabling the primary functions of the lawn mower to be utilized simultaneously with the operation of the pumping apparatus.

It is a further object of the present invention to provide a pump and spraying apparatus for incorporation with conventional lawn mowers which is adapted to be driven or powered by the lawn mower drive or crank shaft by an appropriate coupler assembly which allows the pump to be nonrotatingly engaged with the crank shaft, even though in some instances the pump is being physically supported thereby, until such time as selective election is made by the operator to engage the coupler mechanism to permit the drive shaft to rotate the pump drive shaft thereby allowing the pump to operate in a normal capacity.

It is yet a further object of the present invention to provide a portable liquid sprayer system which may be utilized with conventional lawn mowers wherein the sprayer system is powered directly by the lawn mower drive shaft without requiring additional or separate power sources.

DESCRIPTION OF THE PREFERRED EMBODIMENT

Figure 1:
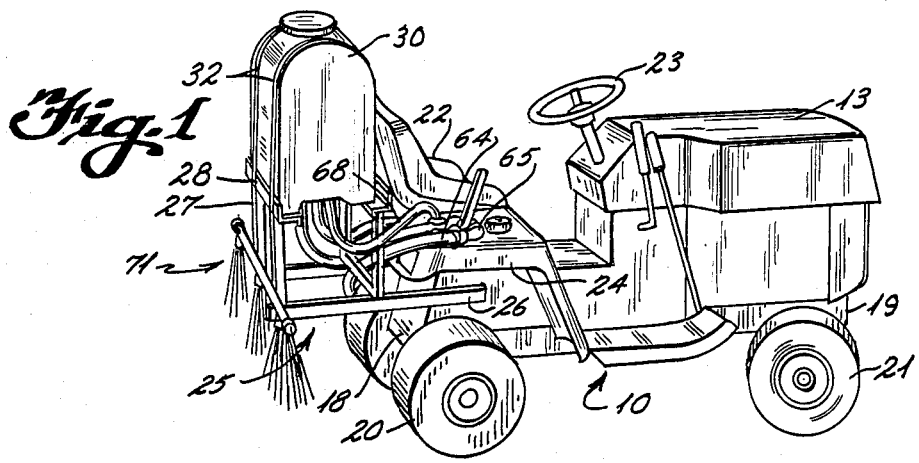
FIG. 1 is an illustrational view of one form of the invention wherein a conventional riding lawn mower has been adapted to support a fluid supply tank which is connected by flexible fluid conveying conduits to a pump mounted beneath the hood of the lawn mower and to a fluid sprayer bar which is mounted to the rear of a lawn mower.

With continued reference to the drawings, the present invention has been developed in order to permit a conventional lawn mower 10 to be utilized to power a pump 11 or a sprayer assembly 12 which may be utilized to distribute liquid fertilizers, weed killers, paints, water or any other flowable liquids without having to alter the lawn mower or adversely restrict its normal operating functions. Although the embodiment of the invention disclosed in the drawings is utilized in incorporation with a conventional riding self-starting lawn mower, it is possible for the present pump and spraying system to be utilized with other conventional power lawn mowers of both the riding and push type. In some instances, some alteration of the conventional pull or starter cord winding assemblies which are attached to engine drive shafts to permit manual cranking of the drive shaft may be necessary. In addition, although the pumping apparatus of the present invention is shown as being utilized in combination with a fluid spraying or distribution system, it is envisioned that the combination lawn mower and pumping apparatus of the present invention may be utilized to operate as a standard conventional pump to convey liquids from one point to another. In this manner, a conventional lawn mower can be utilized to power a pump so as to permit homeowners to withdraw liquids from flooded areas, sumps and the like by simply extending an intake line and a discharge line from the pump which is attached to the lawn mower engine drive shaft as will be discussed in greater detail hereinafter.

In the preferred embodiment, the lawn mower 10 is shown as comprising a hood 13 which is mounted over an engine block generally designated at 14 having a drive shaft 15 extending therethrough. The uppermost end of the drive shaft is threaded as shown at 16 and normally receives a nut (not shown) which secures the upper end of the drive shaft relative to a rotational screen 17 which prevents debris from entering the area of the rotating components of the drive shaft. In the present embodiment, no hand-cranking mechanism is disclosed as the lawn mower is of a self-starting type.

The lawn mower further includes a chassis having a rear end 18, forward end 19, drive wheels 20 and forward steering wheels 21. A seat 22 is provided in spaced relationship from the steering column 23 and is intermediate a pair of fenders 24 extending on either side thereof.

With respect to FIG. 1, a mounting bracket assembly 25 is attached to the rear chassis of the lawn mower by providing a pair of horizontally extending bracket members 26 from which a plurality of vertically extending U-shaped support members 27 are supported. A pair of opposing support channels 28 are secured to the upper portion of the vertical supports 27 so as to provide a mounting surface for a fluid supply tank 30 which is selectively mounted therebetween. In order to secure the fluid supply tank 30 in seated relationship with the opposing channels, a pair of straps 32 may be extended on opposite sides of the tank and over and about the opposing support channels. Appropriate locking means (not shown) may be utilized to secure the straps in place.

Figure 3:
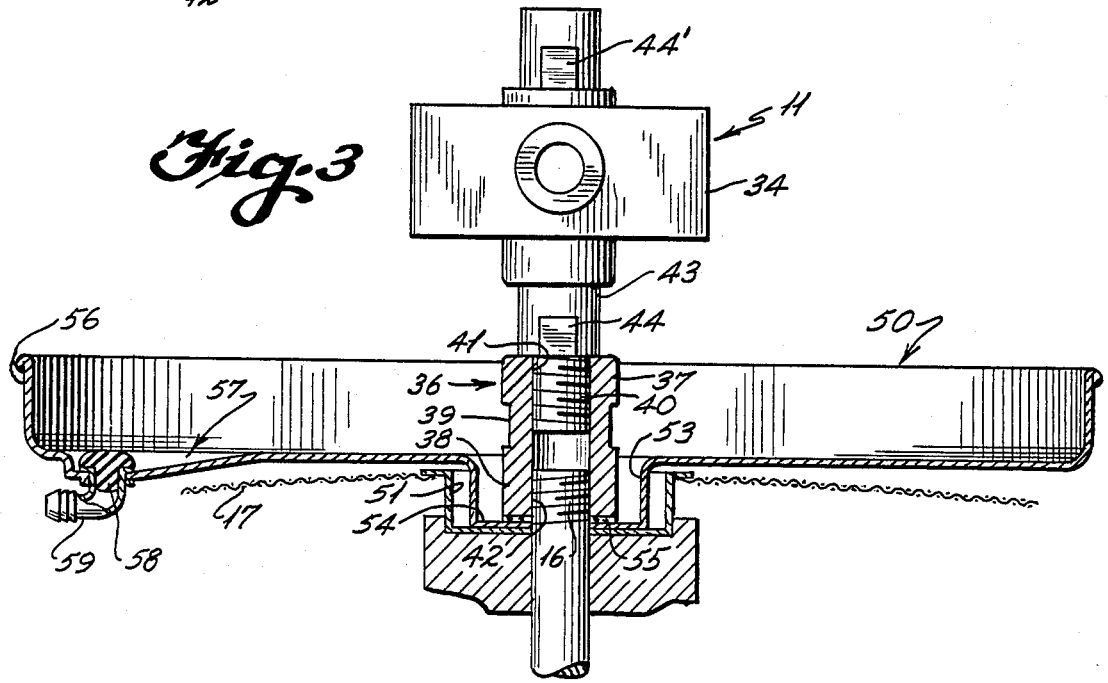
FIG. 3 is an enlarged partial cross sectional view showing the pumping apparatus utilized in FIGS. 1 and 2 mounted to the upper portion of the drive shaft of the lawn mower engine wherein the pump is mounted above a fluid collection tray.
Figure 4:
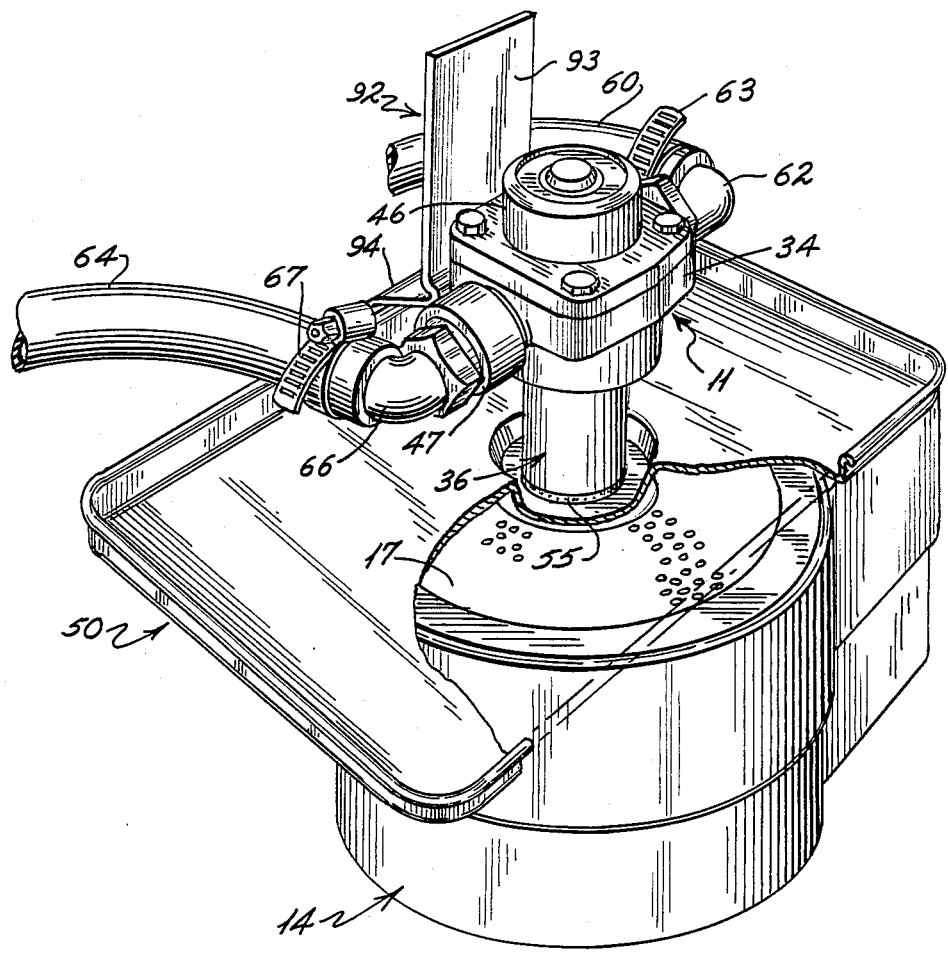
FIG. 4 is an enlarged perspective view of the pumping apparatus of the present invention as attached to the upper portion of the drive shaft of the conventional lawn mower shown in FIG. 1 showing portions of a collection tray broken away to show the underlying detail of the upper portion of the engine casing of the conventional lawn mower.

With particular reference to FIGS. 3 and 4 of the drawings, a pump 34 is secured to the uppermost end 16 of the drive shaft of the lawn mower by way of a connector 36 having upper and lower end portions 37 and 38, respectively. The intermediate portion of the sides of the connector 36 are provided with wrench flats 39 which may be utilized to engage the connector to prohibit its rotation or to selectively rotate the connector relative to the upper end of the drive shaft 16 or the input drive shaft 40 of the pump 34. In the embodiment shown, the input drive shaft 40 is shown as being threadingly engaged within a threaded socket 41 provided in the uppermost portion of the connector 36. The lowermost portion 42 of the connector is also provided with screw threads which engage the threads on the upper end of the drive shaft of the lawn mower. In order that the connector operates as self-locking connector, the screw threads 41 defined within the upper portion of the connector and the screw threads provided in the lower portion 42 of the connector are the same pitch and diameter and are so directed as to tighten their mutual engagement with the opposing male threads when the drive shaft is rotated to turn the pump drive shaft. To further assist in the make and brake assembly of the components, the intermediate portion 43 of the pump drive shaft is provided with opposing flats 44 which may be utilized for the placement of wrenches to assist in prohibiting rotation of the drive shaft relative to the connector 36. In order to facilitate the installation of the pump relative to the connector 36 or drive or crank shaft 16, the upper end of the pump drive shaft 40 may be extended above the pump housing, as shown in FIG. 3. In this embodiment, flats 44' may be provided on opposite sides of the extended portion of the drive shaft. This will negate the need for the flats 44 on the intermediate section or portion of the pump drive shaft and also allow for easier manipulation of the pump drive shaft during installation or removal of the pump.

It should be noted that as opposed to using the separate connector 36, in some instances, the lowermost end of the pump drive shaft may be provided with an integrally formed socket which would cooperatively receive the upper end of the engine crank or drive shaft. Thus, the connector would be an integral portion of the pump drive shaft.

Also, although a threaded connector is shown in the drawings, other types of connectors could be used such as splined connectors or connectors requiring set screws. Further, the connectors between the pump drive shaft and lawn mower crank shaft may include a clutch mechanism which would permit the pump drive shaft to be selectively engaged or disengaged, as desired, with the lawn mower crank shaft without having to remove the pump from its mounted relationship with respect to the lawn mower.

The pump may be of various conventional constructions including rotary pumps, centrifugal pumps, piston pumps or roller type pumps. A preferred type pump is manufactured under the name of Delavan by Colt Industries. The pump shown in the drawings is typical of a 4-roller side port pump model 44-5111 Delavan pump which is capable of delivering 9.2 gpm when utilized with gas drive engines at speeds up to 2600 rpm. The normal operating efficiency normally extends between 6.5 and 9.2 gpm depending upon rotational drive inputs of 1800–2600 rpm with operating pressures being established up to 150 p.s.i.g. It should be emphasized, however, that other types of pumps may be utilized and adapted for use with the present invention. The pump 34 includes a main housing 45 having an inlet 46 and discharge 47.

With particular reference to FIG. 3, when the pump of the present invention is installed on a conventional lawn mower having a vertically oriented drive shaft such as shown in FIG. 3, a fluid collection tray 50 is mounted intermediate the connector 36 and the inner support frame 51 of the conventional lawn mower housing engine screen 17. The central portion of the collection receptacle is shown as having a depending generally annular flange 53 and end wall 54 having an opening therein which is substantially equal to the diameter of the upper end of the engine drive shaft. A sealing gasket 55 is disposed between the end wall 54 of the collection tray 50 and the lowermost portion of the connector 36 in order to prohibit any liquid collected within the tray from passing downwardly and into the engine drive shaft.

The fluid collection tray 50 is provided with upstanding side walls 56 which prevent any fluid from being splashed or spilled over the edges thereof. In order to provide an easy means for removing fluid from the collection tray, one section of the tray may be depressed as shown at 57 to create a sump area which is normally sealed by a plug 58 which covers a fluid discharge or outlet pipe 59 through which liquid deposits may be readily siphoned from the collection tray.

As previously discussed, once the pump 34 of the present invention has been drivingly connected to the upper portion of the lawn mower drive shaft, the pump may be utilized to convey fluids from one point to another. In such an embodiment, an inlet hose would be attached to the inlet of the pump and an outlet or discharge hose attached by appropriate means to the discharge side of the pump. In the preferred form of the invention, the pump is adapted to be utilized with a sprayer system 12 as will be discussed with specific reference to FIGS. 1, 2 and 4.

The sprayer system of the present invention includes the liquid supply tank 30 which is connected by a first hose or conduit 60 to the inlet 46 of the pump 11. A valve 61 may be placed along the length of the conduit 60 in order to selectively adjust the flow through such conduit. In making the connection of the first conduit 60 with the inlet of the pump, an elbow fitting 62 is threadingly received within the inlet and thereafter the end of the first conduit inserted over the elbow with a suitable band clamp 63 being provided to frictionally engage the end of the conduit with the elbow.

A second fluid conduit 64 extends from the discharge side 47 of the pump 11 to a control valve assembly 65 which is secured to the fenders 24 of the lawn mower by appropriate fasteners or retention brackets. The second conduit is secured to another elbow member 66 which is threadingly received within the discharge port 47 of the pump. A second band clamp member 67 is provided for securely engaging the conduit 64 with the elbow connector.

In order to complete a continuous fluid circuit between the pump and the tank 30, a third conduit 68 extends from the tank to the control valve assembly 65. A valve 69 is provided along the length of the conduit 66 so as to selectively open and close the conduit depending upon whether fluid is to be returned to the tank 30 or dispensed through the control valve 65 to an outlet 70 to which one or more spray assemblies may be selectively attached.

As shown in FIG. 1 of the drawings, in one form of the invention, a spray bar 71 may be selectively secured to the support frame 25. The spray bar will include a plurality of discharge nozzles 72 which may be equally spaced along the length of the spray bar. The spray bar is also provided with an inlet nipple 73 over which a flexible hose or conduit 74 is selectively attached. The free end of the flexible conduit 74 may be selectively inserted over the discharge nipple 70 of the control valve assembly 65. With use of the spray bar assembly, fluid from the tank can be passed through conduit 60, pump 11, conduit 64 and through control valve assembly 65 to the spray boom 71. Fluid passing through the spray boom will thereafter be discharged evenly from the spray nozzles. In this embodiment of the invention, the lawn mower may be driven in a conventional manner thereby allowing fluid passing from the spray bar to be sprayed and distributed over expansive areas. The operation of the pump should not effect the operating efficiency of the engine thereby the engine may be utilized in its normal driving capacity to power the drive wheels 20. In some instances, it may be possible to simultaneously spray fertilizers, insecticides, weed control chemicals and/or other fluids from the tank 30 while using the lawn mower in its conventional capacity to cut grass.

As an alternative form of the invention, a hand-held spray wand 80 may be provided having a discharge nozzle 81 which is connected to the discharge 70 of the control valve assembly 65 by way of a flexible conduit or hose 82. The spray wand 80 may be utilized to spray areas above the ground with the pressures developed by the pump being sufficient to permit fluids to be sprayed in out of the way and hard to reach areas.

The sprayer system 12 of the present invention is also provided with a pressure gauge 90 which is connected to fluid conduit 64 upstream of the control valve assembly 65. The pressure gauge will allow the operator to determine optimum discharge pressures with the pressure being adjustable by regulating either valves 65 or 69 to effectively control the quantity of liquid passing through the fluid circuit. The control valve 65 is a three-way valve which permits fluid to be channeled from the fluid conduit 64 to either or both of the discharge outlet 70 or the return conduit 68.

Figure 2:
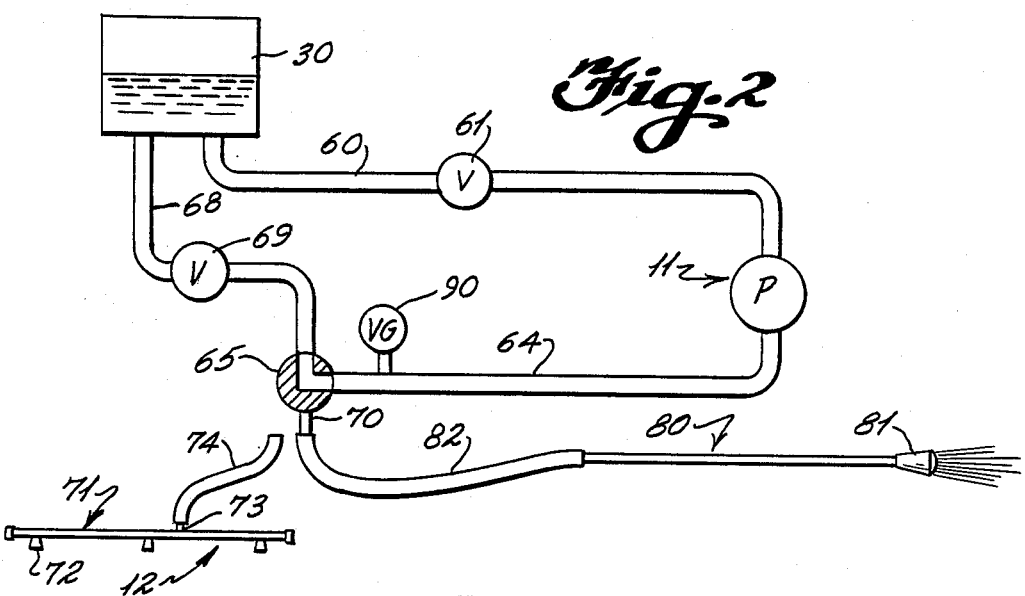
FIG. 2 is an illustrational fluid circuit diagram of the sprayer apparatus of FIG. 1.

In the operation of the sprayer system of the present invention, when it is desired to simply mix chemicals within the fluid tank 30, valves 61 and 68 are opened with control valve 65 being closed so as to create a continuous fluid circuit as shown in FIG. 2. In this embodiment, during the operation of the lawn mower engine, the pump will cause fluids to be cycled through the circuit. When it is desired to prevent the flow of any fluid within a circuit, valve 61 may be closed or selectively opened to atmosphere to prevent any fluid from passing through the line 60 to the intake of the pump. When it is desired to use either the spray boom 71 or the hand wand 80, the valve member 61 is opened and valve 69 is closed. Thereafter, the control valve assembly 65 is opened to permit a fluid circuit to be created between the fluid conduit 64 and the outlet nipple 70 to the appropriate sprayer assembly.

Although the sprayer assemblies of the present invention have generally been discussed for use with fertilizers, insecticides, weed control chemicals and the like, it is possible that other liquids including water, paint, or other generally non-viscous liquids may be utilized with the system of the present invention. In addition, although the pump has been shown as being mounted to a vertically oriented engine, it is possible that the pump could likewise be mounted in an appropriate manner to a sideways oriented engine.

Under normal circumstances, the pump is supported directly by the engine drive shaft with any rotation of the pump being prevented by the attached fluid conduits or hoses 60 and 64. In some circumstances, it may be desirable to anchor the tray to the pump by providing a bracket assembly 92. The bracket includes an upper end 93 which is bolted directly to the pump and a lower end 94 which extends outwardly from the pump toward the backside of the collection tray 50. Appropriate fasteners may be provided to secure the tray to the bracket.

I claim:

1. A combination lawn mower and pump apparatus comprising a lawn mower having a chassis and an engine mounted to said chassis, a crank shaft mounted within said engine and having an outer end portion extending vertically upwardly with respect to said engine, a connector means having first and second end portions, said first end portion of said connector means being mounted to said outer end of said crank shaft so as to be in axial alignment therewith, a pump means supported by said engine, said pump means having a housing having an inlet and discharge port and a drive shaft having a driven end portion, said driven end portion of said drive shaft being connected to said second end portion of said connector means, whereby said drive shaft of said pump means is powered by being directly driven by said crank shaft of said lawn mower.

2. The combination lawn mower and pump apparatus of claim 1 including first conduit means having e first end connected to said inlet portion and second conduit means having a first end connected to said outlet port. engine and having an outer end portion disposed remotely above said wheels, a connector means having first and second end portions, said first end portion of said connector means being mounted to said outer end of said crank shaft so as to be in axial alignment therewith, a pump means, said pump means having a housing having an inlet and discharge port and a drive shaft having a driven end portion, said driven end portion of said drive shaft being connected to said second end portion of said connector means, a tray means mounted between said pump means and said outer end of said crank shaft and seal means mounted between said tray means and said connector means for sealing said tray means in fluid-tight relationship with respect to said outer end of said crank shaft, whereby said drive shaft of said pump means is powered by being directly driven by said crank shaft of said lawn mower.

3. The combination lawn mower and pump apparatus of claim 2 in which said outer end portion of said crank shaft includes outwardly extending screw threads, said connector means including first and second threaded sockets formed in said first and second end portions, respectively and said outwardly extending screw threads of said outer end portion of said crank shaft being cooperatively receivable within said threaded socket of said first end portion of said connector means.

4. The combination lawn mower and pump apparatus of claim 3, in which said driven end portion of said drive shaft of said pump includes outwardly extending screw threads which are selectively seated with said threaded socket of said second end portion of said connector means, an intermediate portion having a diameter which is larger than the diameter of the driven end portion thereof, at least one pair of opposing flats formed on said intermediate portion of said drive shaft.

5. The combination lawn mower and pump apparatus of claim 2 including a fluid receiving tank means mounted to said lawn mower, said first conduit means having a second end connected to said tank means, a control valve means, said second conduit means having a second end connected to said control valve means, and fluid discharge means connected to said control valve means whereby fluid from said tank means will be pumped by said pump means through said control valve means to said fluid discharge means.

6. The combination lawn mower and pump apparatus of claim 5 including a third conduit means, said third conduit means being connected between said control valve means and said tank means.

7. The combination lawn mower and pump apparatus of claim 6 including a first valve means disposed along said third conduit means between said tank means and said control valve means, said first valve means being operable to open or close third conduit means.

8. The combination lawn mower and pump apparatus of claim 7 in which said fluid discharge means includes a spray bar means, said spray bar means having a plurality of outlets therein, means for mounting said spray bar means to said lawn mower, and a conduit extending from said control valve means to said spray bar means.

9. The combination lawn mower and pump apparatus of claim 7 in which said fluid discharge means includes a spray wand having an elongated body and outer spray head portion, and a flexible conduit extending between said control valve means and said elongated body of said spray wand.

10. The combination lawn mower and pump apparatus of claim 7 including a second valve means, said second valve means being disposed along said first conduit means between said tank means and said inlet port of said pump means, said second valve means being operable to open or close said first conduit means.

11. The combination lawn mower and pump apparatus of claim 10 including a pressure gauge means, said pressure gauge means being mounted along said second conduit means between said pump means and said control valve means.

12. A combination lawn mower and pump apparatus comprising a lawn mower having a chassis mounted on wheels and an engine mounted to the chassis, a crank shaft mounted within said engines and having an outer end portion disposed remotely above said wheels, a connector means having first and second end portions, said first end portion of said connector means being mounted to said outer end of said crank shaft so as to be in axial alignment therewith, a pump means, said pump means having a housing having an inlet and discharge port and drive shaft having a driven end portion, said driven end portion of said drive shaft being connected to said second end portion of said connector means, a tray means mounted between said pump means and said outer end of said crank shaft and seal means mounted between said tray means and said connector means for sealing said tray means in fluid-tight relationship with respect to said outer end of said crank shaft, whereby said drive shaft of said pump means is powered by being directly driven by said crank shaft of said lawn mower.

13. The combination lawn mower and pump apparatus of claim 12 in which said tray means includes an upper peripheral wall section and a bottom wall which define a fluid receiving reservoir, a central depending flange portion integrally formed with said bottom wall and having an opening therethrough, said opening being of substantially the same diameter as the diameter of said outer end of said crank shaft so that said crank shaft is cooperatively received therethrough.

14. The combination lawn mower and pump apparatus of claim 13 in which said tray means includes a sump formed in said bottom wall thereof, and drain means within said sump for allowing fluid to pass from said tray means.

15. The combination lawn mower and pump apparatus of claim 14 including bracket means, said bracket means having first and second ends, said first end of said bracket means being connected to said pump means and said second end of said bracket means supporting said tray means whereby said bracket means stabilizes said tray means with respect to said crank shaft.

16. A combination lawn mower and spraying apparatus comprising a lawn mower, said lawn mower having a body portion which is supported by ground engaging wheels, an engine mounted to said body portion and having a crank shaft having an end portion extending outwardly with respect to said engine, pump means carried by said lawn mower adjacent said end portion of said crank shaft and having a drive shaft extending outwardly therefrom, said pump means having inlet and discharge ports, connecting means for connecting said drive shaft of said pump means to said end portion of said crank shaft so that said drive shaft is axially driven in alignment therewith, a tank means, means for mounting said tank means to said lawn mower, first conduit means extending from said tank means to said inlet port of said pump means, a control valve assembly, second conduit means extending from said discharge port of said pump means to said control valve assembly, a sprayer means, and conduit means for connecting said control valve means in fluid communication with said sprayer means.

17. The combination lawn mower and sprayer apparatus of claim 16 including a third conduit means extending from said control valve means to said tank means, and valve means disposed along said third fluid conduit means for selectively opening and closing said third fluid conduit means.

18. The combination lawn mower and sprayer apparatus of claim 17 in which said sprayer means includes a spray bar mounted to said body portion of said lawn mower.

19. The combination lawn mower and sprayer apparatus of claim 18 including a second valve means disposed along said first conduit means for selectively opening and closing said first conduit means.

20. The combination lawn mower and sprayer apparatus of claim 16 including a tray means mounted intermediate said pump means and said end portion of said crank shaft, and means for sealing said tray means with respect to said crank shaft.

21. A combination lawn mower and pump and sprayer apparatus comprising a lawn mower having a chassis and hood, an engine mounted to said chassis beneath said hood, a crank shaft mounted within said engine and having an outer end portion disposed vertically with respect to said engine, a pump means disposed adjacent to said engine and beneath said hood, said pump means having a housing with inlet and outlet ports and a drive shaft having a driven end portion, means for connecting said driven end portion of said drive shaft so as to be in axial alignment with said outer end portion of said crank shaft, a sprayer assembly mounted to said lawn mower, conduit means for connecting said sprayer assembly to said outlet port of said pump means whereby said drive shaft of said pump means is powered by being directly driven by said crank shaft of said lawn mower.

22. The combination lawn mower and pump and sprayer apparatus of claim 21 including a fluid tank, means for mounting said fluid tank to said lawn mower, and another conduit means communicating said fluid tank to said pump means.

* * * * *